July 6, 1948.  M. L. DEVOL  2,444,731
ROLLING OF GLASS TO FORM SHEETS
Filed Feb. 26, 1943  2 Sheets-Sheet 2
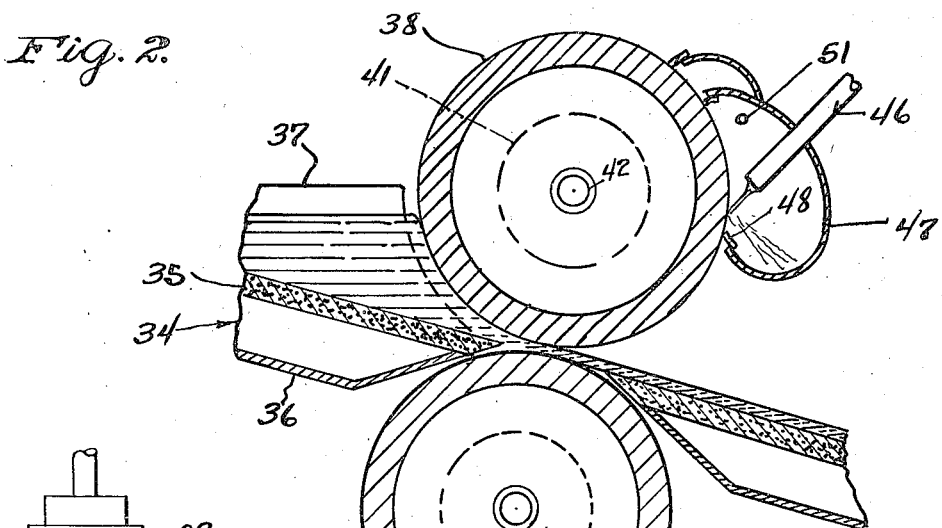
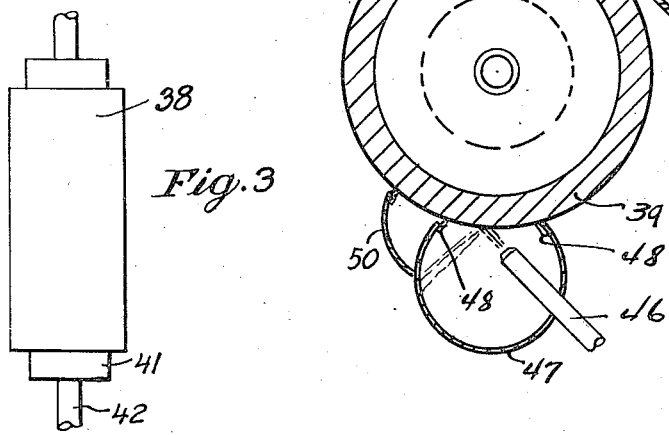
Inventor
MANSON L. DEVOL
By Olen E. Bee
Attorney Patented July 6, 1948

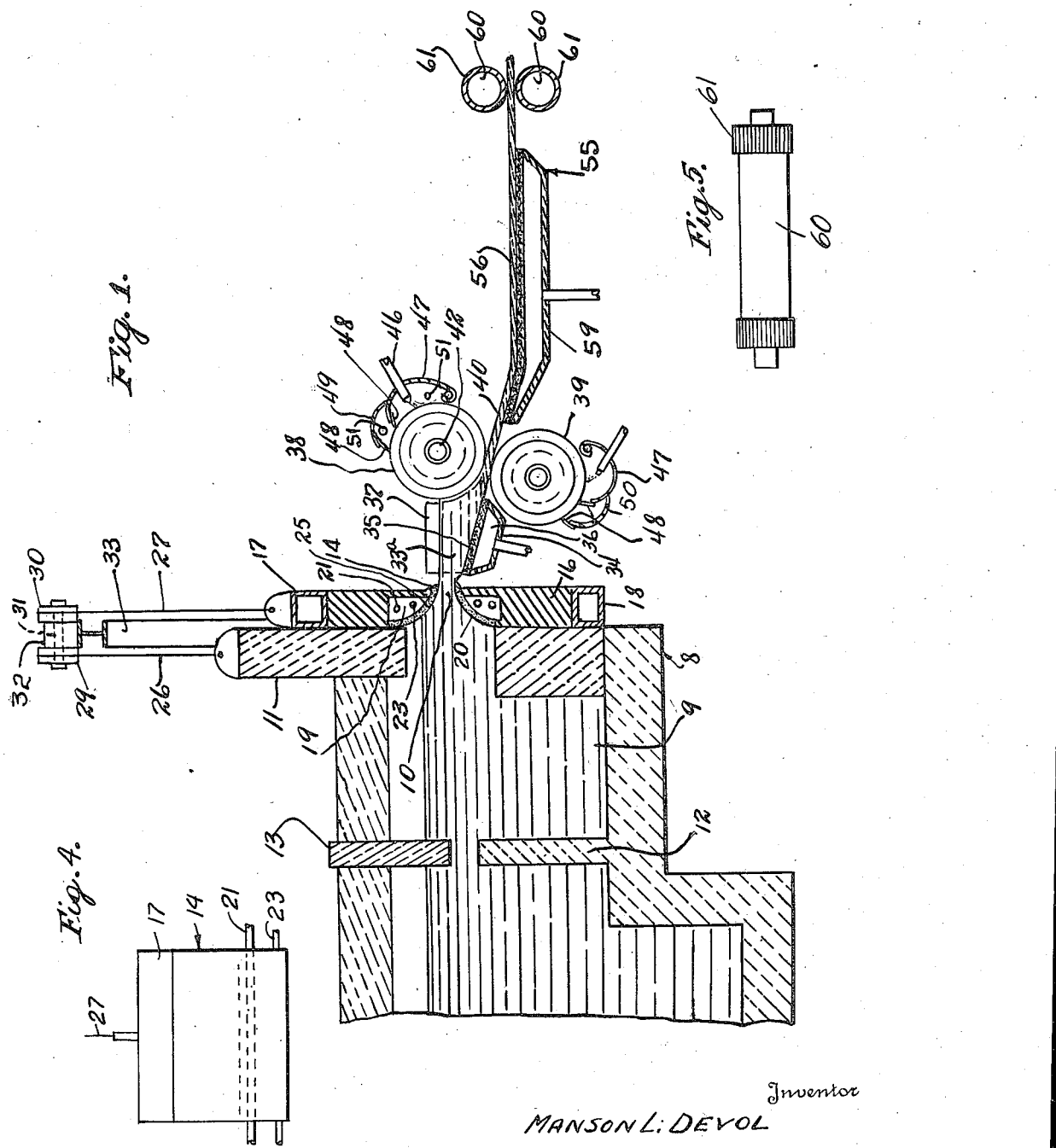

2,444,731

UNITED STATES PATENT OFFICE 2,444,731

ROLLING OF GLASS TO FORM SHEETS

Manson L. Devol, Wilkinsburg, Pa., assignor to Pittsburgh Plate Glass Company, Allegheny County, Pa., a corporation of Pennsylvania Application February 26, 1943, Serial No. 477,231

1 Claim. (Cl. 49—87)

The present invention relates to the forming and shaping of glass sheets from molten glass, and it has particular relation to the formation and shaping of such sheets by means of rollers to which glass is fed in molten state and rolled out into sheets of suitable thickness.

One object of the invention is to provide a method of sizing and shaping glass sheets in a rolling operation, by application of which dimensions and shapes can be maintained with greater accuracy than is possible in conventional processes.

A second object is to provide an improved process of cooling the rollers employed in the rolling of glass.

A third object is to provide rollers as above described, in which internal stresses, due to temperature gradients in the rollers, are reduced to a minimum.

These and other objects of the invention will be apparent from consideration of the following specification and the appended claim.

In accordance with the previous application of mine bearing Serial No. 473,191, filed January 22, 1943, now Patent No. 2,387,886 and entitled Forming glass sheets, it is proposed to form and size sheets of glass as they are rolled out by employing rollers which are driven at a relatively high speed, e. g., several times that of the glass sheet which is being formed. When the rollers are so driven it is found that thin films of air cling to the surface, thus preventing any physical contact between the rollers and the surface of the glass which is being sheeted. The transformer of heat to the rapidly driven or spinning rollers occurs almost entirely through radiation, and moreover the rate of spinning of the rollers is so rapid that there is but slight differential of temperature in the perimeter of the rollers. As a result there is but little tendency for the rollers to warp, thus making it possible to roll the sheets with a high degree of accuracy. At the same time erosion and deterioration of the rollers by reason of contact with the hot glass is obviated. The performance of the rollers is thus greatly improved. Still, however, cooling must occur by radially inward conduction of heat to a suitable cooling liquid within the rollers. Therefore, the surfaces of the rollers constitute the hottest portions. Certain stresses, due to this radial differential of temperature, are thus possible.

In accordance with the provisions of the present invention, it is proposed firstly, to reduce the radial differential of temperature and to increase heat transfer from the glass being rolled by subjecting the surfaces of the rollers to direct contact with a cooling medium, such as water, applied by spraying or by other suitable methods of wetting. Secondly, it is proposed to relieve any stresses between the surface zone of the rollers and the subsurface zones by scoring the surfaces of the rollers in such manner as to divide it into small sections. The lines of scoring prevent transmission of stresses from one section to the contiguous sections, and thus prevent addition of stresses of one section to those of the next.

It is not possible to apply either of these principles except with rapidly spinning rollers. Water applied to a side of a slowly rotating roller would so increase the perimetrical temperature gradient as to exaggerate warpage. Grooves in a slowly rotating roller would mar the soft sheet with which it contacted.

For a better understanding of the invention reference may now be had to the accompanying drawings in which Fig. 1 is a fragmentary sectional view illustrating a glass tank equipped with surface cooled rollers in accordance with the present invention;

Fig. 2 is a fragmentary sectional view illustrating on a larger scale the structure of the rollers employed in the embodiment of the invention shown in Fig. 1;

Fig. 3 is a detailed side view of a suitable roller for use in practicing the invention.

Fig. 4 is a detailed front elevation of a drawing lip used for forming the sheet of glass as it emerges from the furnace.

Fig. 5 is a detailed side view of a roller used to pull the formed glass away from the rolling apparatus.

In the drawings like numerals refer to like parts throughout.

The construction as shown in Fig. 1 includes a glass tank 8, which may be of any convenient design and may be heated in any convenient manner. The tank is provided with a forehearth or drawing compartment 9 having a discharge opening 10 through which molten glass can flow for rolling into a sheet. A vertically slidable gate 11 is provided for this opening and may be employed to close the opening during periods when glass is not being drawn. A dam 12 terminating below the level of the glass in the tank and a vertically slidable gate 13 registering in vertical plane therewith constitute means for controlling the level of the glass in the forehearth independently of that in the main body of the tank to increase or decrease the flow of glass through the opening 10. Assuming that the gate is open and the glass in the forehearth is at the same height as that in the main chamber of the tank, maximum hydrostatic head will be afforded to force molten glass between the drawing lips of the furnace. If the gate is lowered to a sufficient degree the flow to the forehearth will be reduced below that required to maintain maximum outflow from the drawing lips. The level in the forehearth will then drop thereby reducing hydrostatic pressure on the glass passing between the lips. The outflow of glass to form the sheet is thus slowed down until equilibrium between the inflow and the outflow in the drawing chamber is reached. If the gate is then raised, of course the inflow of glass to the drawing chamber is increased, the hydrostatic head will rise and will induce a more rapid outflow of glass between the drawing lips. Means is thus provided for controlling the rate of output of the apparatus.

Draw lips 14 and 16 of refractory material are supported above and below the opening upon tubular bars 17 and 18. These bars may be supplied with cooling fluid if so desired. One of the lips, e. g., the upper one 14, is disposed for vertical adjustment in order to admit of regulation of the thickness of the stream of glass passing therebetween. If desired the lips may be formed with chambers 19 and 20 to which gas, such as air under slight pressure, may be supplied by means of conduits 21. Conduits 23 through which a cooling medium, such as water is circulated in convenient manner, may also be disposed in the chambers to cool the lips and also to control the viscosity of the glass sheet.

The surfaces of the lips contacting with the molten glass may be formed of porous material, such as suitably configured plates 25 of cohered granular silica, pressed and sintered powdered metal, Carborundum or the like, which will withstand the high temperature and corrosive action of any glass contacting with them. The granular nature of the plates provides a myriad of tortuous channels through which the gases in the chambers can slowly filter. The pressure within the chambers is so regulated that uniform films of relatively quiescent gas are maintained upon the outer surfaces of the lips, thus obviating the contact between the surfaces of the plates and the molten glass without introducing bubbles into the glass sheet.

Vertically adjustable gate 11 and lip 14 are supported by cables 26 and 27, trained about pulleys 29 and 30, which in turn are journaled to revolve upon a shaft 31 in a block or bearing 32. The block in turn is supported upon a column 33 extending above the forehearth 9. The ends of the cables are attached to any convenient take-up device, such as counterweights or winding drums (not shown).

The stream of glass 33ᵃ from the lips is carried upon or supported by an apron 34. This apron includes a porous plate member 35 and an air chamber 36 to which gases under compression can be supplied in order to float the glass stream in the thin film clinging to the plate. The member 34 may also be provided with "guns" 37 at the sides thereof to prevent lateral flow of the glass.

The glass passes from the apron to spaced sizing rollers 38 and 39 of polished nickel steel, or the like, which preferably are driven at a peripheral speed of at least 800 inches per minute, in order to maintain thin films of air that prevent physical contact with the soft and plastic glass passing therebetween. Glass sheet 40 from the rollers may move at a speed of 40 to about 140 inches per minute. The rollers, as shown in Fig. 3, include main body portions with bearing portions 41 at the ends thereof. The rollers are also tubular and may be supplied with cooling medium, such as water through conduits 42 extending coaxially through the bearing portions 41.

Means for applying cooling water directly to the surfaces may be provided. Such means, as best shown in Fig. 2, may comprise a jet or spray device 46 designed to project sprays of water at high pressures, e. g., 300 to 1000 lbs. per sq. inch directly upon the roller faces. It will be manifest that a series of these devices may be arranged along the entire length of each roller, in order to obtain uniform axial cooling. The excess spray water from the rollers is caught in a trap device, which may conveniently comprise a shell 47 having edge portions provided with resilient wipers 48, of rubber or the like, designed to remove any excess moisture clinging to the drums. Auxiliary shells 49 and 50 may be provided at the sides of the shell 47 and may be connected to sources of vacuum through conduits 51. The vacuum assists in drying the rollers.

The sized sheet from the rollers 38 and 39 is received upon a second apron indicating generally at 55 and including porous plate member 56 and an air chamber 59, designed to supply air to maintain a thin film upon the outer surface of the plate.

Slight tension may be placed upon the length of glass upon the plate by means of driven rollers 60, which enlarged milled end portions 61 to grip the edges of the glass only, and which function to convey the sheet to an annealing lehr (not shown).

In the operation of the apparatus herein shown molten glass from tank 8 at a convenient temperature for rolling or drawing passes into the chamber 9 and out between the lips 14 and 16, where it is discharged over the apron 34 to the rollers 38 and 39 for sizing into plate 40 of uniform caliper. These rollers are driven at a speed preferably of about 800 to 6000 inches per minute, in order to maintain a thin film of air upon the surface thereof. The rollers may be cooled simultaneously internally and externally. However, external cooling may often be sufficient. This is effected by the sprayed water from the nozzles 46. Preferably the glass is drawn out at a rate of about 40 to 140 inches per minute though variations in this speed are permissible. The sheets are carried at all times while the glass is still plastic, upon films of air which prevent substantial friction and also prevent marring of the plastic glass by contact with solid surfaces. The glass when it reaches rollers 60 is sufficiently cool and hard to resist marring.

The glass moves forwardly between rollers 38 and 39 primarily because of the hydrostatic head back of the rollers and because of the pull upon the glass sheet from the rollers 60. The thin films of gas upon the first-mentioned rollers prevent gripping of the soft glass by the surfaces and there is but little or no mixing and kneading of the glass by reason of the rollers. The soft plastic glass is merely pressed or squeezed. For these reasons no gas is kneaded into the glass.

The rollers 38 and 39 spin so rapidly that there is but little difference in temperature in the various portions of the circumference thereof. The warpage and distortion of the rollers due to differential expansion between the different parts is thus prevented and uniformity of thickness of the glass is insured. The surfaces of the rollers are also sufficiently cool to insure rapid cooling of the glass passing between them.

The forms of the invention herein shown and described are given by way of example only. Numerous modifications may be made therein without departure from the spirit of the invention or the scope of the appended claim.

What I claim is:

In a process of forming continuous ribbons of glass of uniform thickness by passing the sheet of molten glass from a tank between a pair of spaced forming rollers having polished surfaces, the steps comprising spinning said roller at a rate above 800 inches per minute and sufficient to entrain films of air upon the surfaces of the rollers whereby to prevent physical contact between the surfaces of the rollers and the surfaces of the sheet of glass being formed and spraying the surfaces of the rollers with water under a pressure of about 300 pounds per square inch whereby uniformly to cool the rollers and then drying the rollers before they contact with the molten glass.

MANSON L. DEVOL.

REFERENCES CITED

The following references are of record in the file of this patent:

UNITED STATES PATENTS

| Number | Name | Date |
|---|---|---|
| 845,434 | Ridd | Feb. 26, 1907 |
| 1,657,214 | Kutchka | Jan. 24, 1928 |
| 1,821,375 | Brancart | Sept. 1, 1931 |
| 1,831,060 | Drake | Nov. 10, 1931 |
| 1,844,062 | Fox | Feb. 9, 1932 |
| 2,094,403 | Hohmann | Sept. 28, 1937 |
| 2,243,194 | Cook | May 27, 1941 |
| 2,326,044 | Littleton | Aug. 3, 1943 |
| 2,387,886 | Devol | Oct. 30, 1945 |